(12) United States Patent
Nagata et al.

(10) Patent No.: US 10,752,205 B2
(45) Date of Patent: Aug. 25, 2020

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Yuya Nagata, Aichi-ken (JP); Takuhiro Saito, Aichi-ken (JP); Tomonari Umakoshi, Aichi-ken (JP); Takahiro Osaki, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 19 days.

(21) Appl. No.: 15/995,592

(22) Filed: Jun. 1, 2018

(65) Prior Publication Data

US 2018/0354454 A1    Dec. 13, 2018

(30) Foreign Application Priority Data

Jun. 9, 2017  (JP) .................................. 2017-114754

(51) Int. Cl.
*B60R 22/34*    (2006.01)

(52) U.S. Cl.
CPC ............ *B60R 22/341* (2013.01); *B60R 22/34* (2013.01); *B60R 2022/3402* (2013.01); *B60Y 2306/09* (2013.01); *B60Y 2400/48* (2013.01)

(58) Field of Classification Search
CPC .................. B60R 22/34; B60R 22/341; B60R 2022/3402; B60Y 2306/09; B60Y 2400/48
USPC ..................................................... 280/801.1
See application file for complete search history.

(56) References Cited

U.S. PATENT DOCUMENTS

| 4,852,908 A | * | 8/1989 | Nishimura | ............... | B60R 22/06 280/804 |
| 2006/0226274 A1 | * | 10/2006 | Nomura | ................... | B60R 22/34 242/379.1 |
| 2006/0243847 A1 | | 11/2006 | Nomura | | |
| 2009/0311066 A1 | * | 12/2009 | Utille | .................... | F16B 31/028 411/11 |
| 2013/0164094 A1 | | 6/2013 | Kammerer | | |

FOREIGN PATENT DOCUMENTS

| CN | 103097245 A | 5/2013 |
| EP | 3032120 A1 | 6/2016 |
| EP | 3032120 B1 * | 11/2018 |

(Continued)

OTHER PUBLICATIONS

Japanese Office Action issued in corresponding Japanese Application No. 2017-114754 dated Jul. 10, 2018.

*Primary Examiner* — Paul N Dickson
*Assistant Examiner* — Kurtis Nielson
(74) *Attorney, Agent, or Firm* — Roberts Calderon Safran & Cole P.C.

(57) ABSTRACT

A webbing take-up device that includes a spool that is rotated in a take-up direction to take up webbing worn by an occupant and that is rotated in a pull-out direction by the webbing being pulled out, and a frame that rotatably supports the spool. The frame includes a fixed stay portion that is fixed to a vehicle body, and a rotation stop stay portion that is disposed spaced apart from the vehicle body and that by being engaged with the vehicle body is restricted from rotational displacement relative to the fixed stay portion.

5 Claims, 3 Drawing Sheets

(56) References Cited

FOREIGN PATENT DOCUMENTS

| JP | S58-22151 U | | 2/1983 |
|---|---|---|---|
| JP | S60115157 U | | 8/1985 |
| JP | H07323817 A | | 12/1995 |
| JP | H10252731 A | | 9/1998 |
| JP | 2006290124 A | | 10/2006 |
| JP | 2006297982 A | * | 11/2006 |
| JP | 2006297982 A | | 11/2006 |
| JP | 2014113871 A | | 6/2014 |
| JP | 2015031362 A | | 2/2015 |
| JP | 2015-107724 A | | 6/2015 |

* cited by examiner

WEBBING TAKE-UP DEVICE

CROSS-REFERENCE TO RELATED APPLICATION

This application claims priority under 35 USC 119 from Japanese Patent Application No. 2017-114754, filed Jun. 9, 2017, the disclosure of which is incorporated by reference herein.

BACKGROUND

Field of the Invention

The present disclosure relates to a webbing take-up device.

Related Art

Japanese Patent Application Laid-Open (JP-A) No. 2015-107724 discloses a webbing take-up device (retractor device) including a frame that rotatably supports a spool and is fixed to a vehicle door. In the webbing take-up device described in this document, an impact absorbing member is interposed between the frame and a part of the vehicle door. The impact absorbing member is thus deformed when opening and closing the door, and impact input to the retractor device is reduced.

From the perspective of suppressing abnormal noise occurring inside the vehicle, it is desirable to be able to suppress vibration occurring when the spool is rotated from being transmitted to the vehicle body.

SUMMARY

In consideration of the above circumstances, a webbing take-up device capable of suppressing vibration occurring when a spool is rotated from being transmitted to a vehicle body is obtained.

A webbing take-up device of a first aspect includes: a spool that takes up a webbing worn by an occupant; and a frame at which the spool is rotatably supported, and that includes: a fixed portion that is fixed to a vehicle body, and a rotation stop portion that is disposed spaced apart from the vehicle body and that, by being engaged with the vehicle body, is restricted from rotational displacement with respect to the fixed portion.

A webbing take-up device of a second aspect is the webbing take-up device of the first aspect, wherein a damping member, that damps vibration transmitted from the frame, is provided between the rotation stop portion and the vehicle body.

A webbing take-up device of a third aspect is the webbing take-up device of the second aspect, wherein: the damping member is deformed between the rotation stop portion and the vehicle body; and a limiting portion, that limits a deformation amount of the damping member, is provided between the rotation stop portion and the vehicle body.

A webbing take-up device of a fourth aspect is the webbing take-up device of the second aspect or the third aspect, wherein: a bolt that is screwed together with a threaded portion provided at the vehicle body is inserted through the rotation stop portion; and the bolt is inserted through a washer that abuts the damping member.

A webbing take-up device of a fifth aspect is the webbing take-up device of any one of the first aspect to the fourth aspect of the present invention, wherein a motor, that is actuated to rotate the spool in a take-up direction, is attached to the frame.

In the webbing take-up device of the first aspect, the fixed portion of the frame is fixed to the vehicle body and the rotation stop portion of the frame is engaged with the vehicle body. The webbing take-up device is thereby attached to the vehicle body in a state in which rotational displacement of, relative to the fixed portion, the rotation stop portion of the frame is restricted. Note that in the webbing take-up device of the first aspect, the rotation stop portion of the frame is spaced apart from the vehicle body. This enables vibration occurring when the spool is rotated to be suppressed from being transmitted from the rotation stop portion of the frame to the vehicle body.

In the webbing take-up device of the second aspect, the damping member is provided between the rotation stop portion of the frame and the vehicle body, thereby enabling vibration transmitted from the frame to the vehicle body to be damped by the damping member.

In the webbing take-up device of the third aspect, the damping member provided between the rotation stop portion of the frame and the vehicle body is deformed between the rotation stop portion of the frame and the vehicle body. The deformation amount of the damping member is limited by the limiting portion. This enables a reduction in the vibration damping effect of the damping member arising due to excessive deformation of the damping member to be suppressed.

In the webbing take-up device of the fourth aspect, the bolt is inserted through the washer that abuts the damping member. This enables torsional deformation of the damping member when the bolt is screwed together with the threaded portion provided to the vehicle body to be suppressed.

In the webbing take-up device of the fifth aspect, the motor is actuated to rotate the spool in the take-up direction and take up the webbing on the spool. Note that in the webbing take-up device of the fifth aspect, the rotation stop portion of the frame is spaced apart from the vehicle body. This enables vibration of the motor to be suppressed from being transmitted from the rotation stop portion of the frame to the vehicle body.

BRIEF DESCRIPTION OF THE DRAWINGS

Exemplary embodiments will be described in detail with reference to the following figures, wherein.

DETAILED DESCRIPTION

Figure 1:
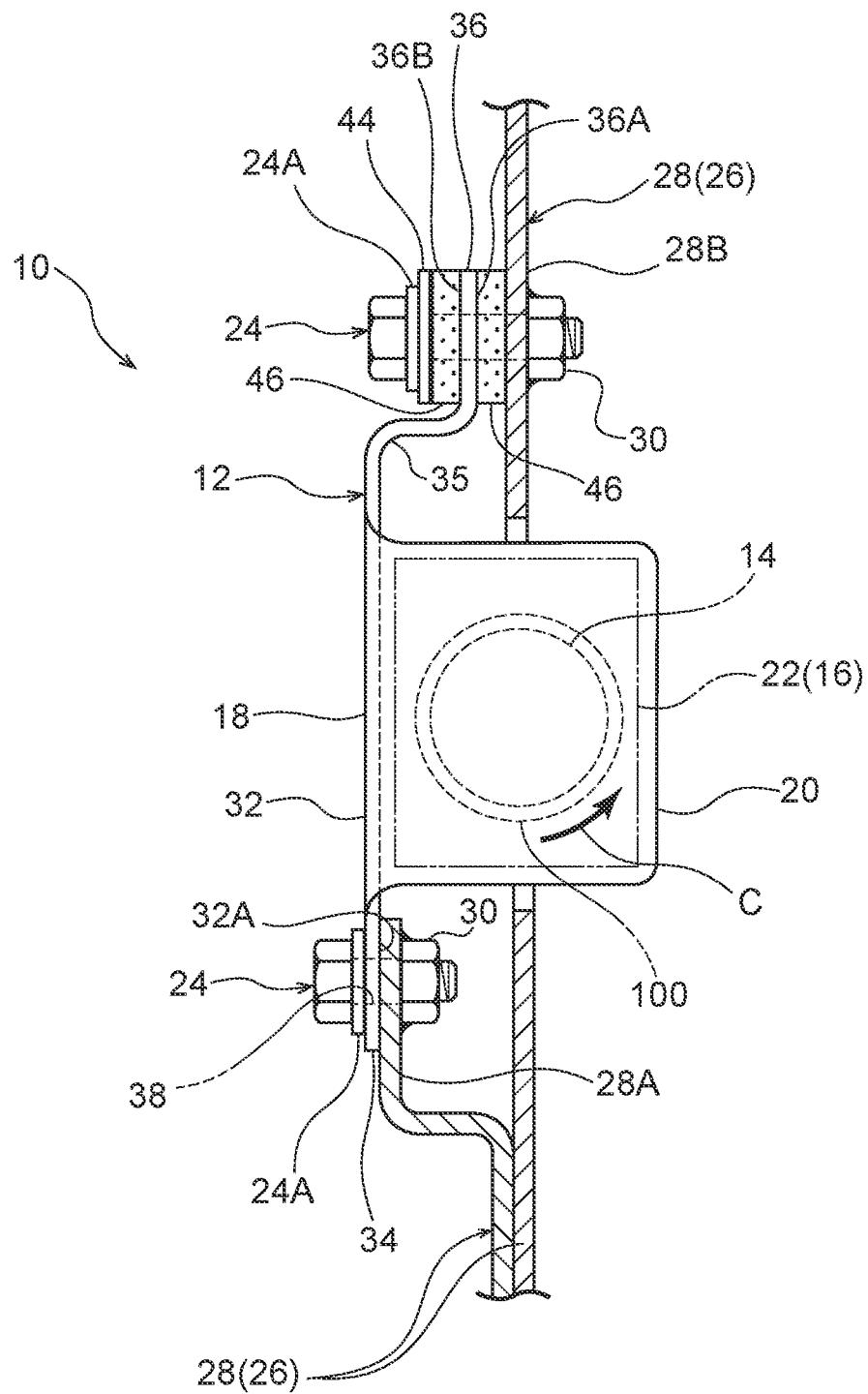
FIG. 1 is a side view schematically illustrating a webbing take-up device of an exemplary embodiment, attached to a vehicle body.
Figure 2:
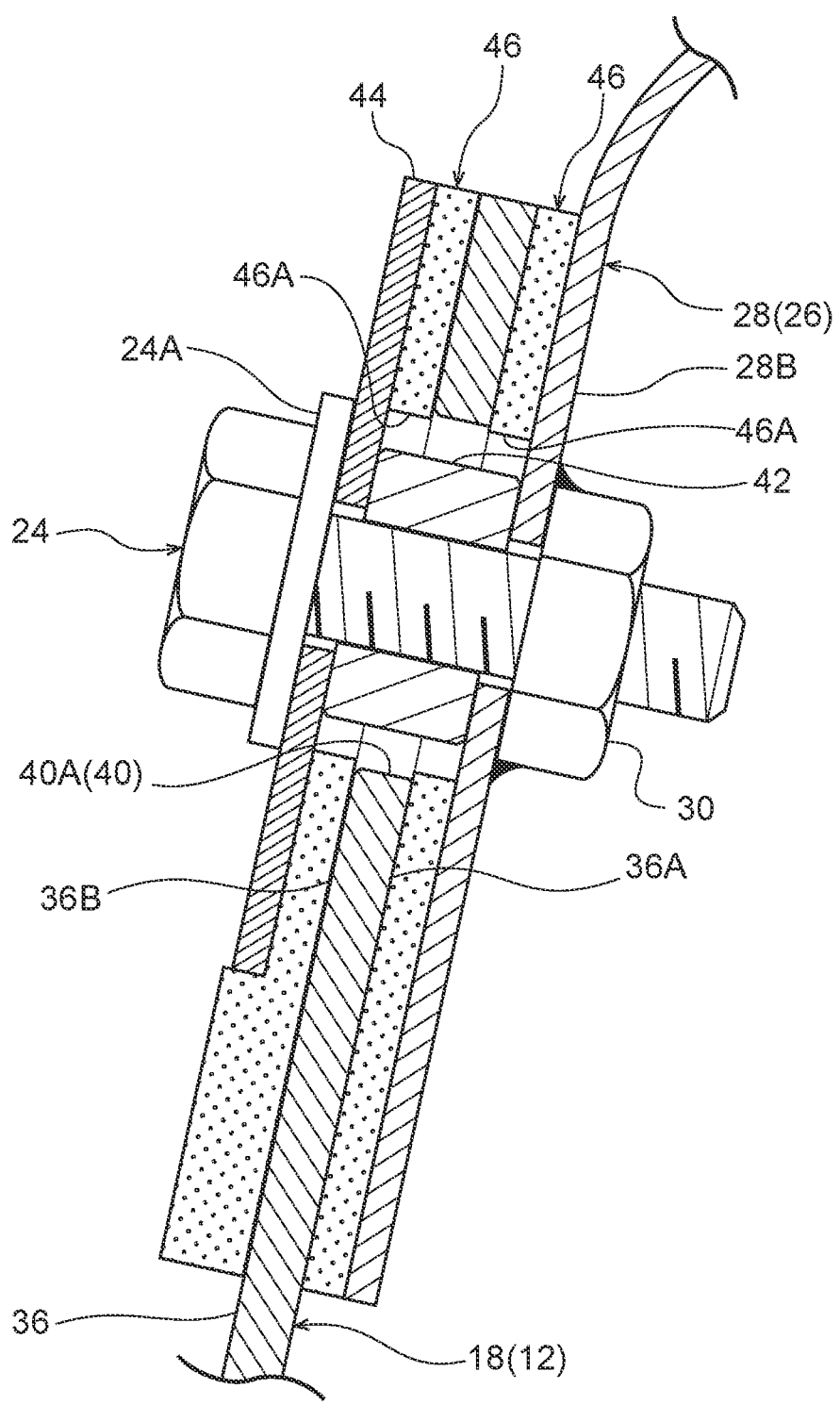
FIG. 2 is a cross-section illustrating a rotation stop portion of a frame.

Explanation follows regarding a webbing take-up device according to an exemplary embodiment, with reference to FIG. 1 and FIG. 2.

As illustrated in FIG. 1, a webbing take-up device 10 according to the present exemplary embodiment includes a frame 12, a spool 14, a webbing 100, and a webbing take-up mechanism 16 that rotates the spool 14.

The frame 12 is formed in a substantially U shape in a plan view, and includes a plate shaped back plate 18 fixed to a vehicle body. The frame 12 also includes a pair of leg plates 20 extending at substantially right angles from respective width direction end portions of the back plate 18.

The spool 14 is formed in a cylindrical shape, and the webbing 100 is taken up onto an outer peripheral portion thereof. The spool 14 is disposed between the pair of leg plates 20 of the frame 12. Note that the spool 14 is rotatably supported by the frame 12 with the webbing take-up mechanism 16, described later, and a non-illustrated pretensioner mechanism interposed therebetween.

The webbing is worn over the body of an occupant. A base end of the webbing, this being an end of the webbing along its length, is anchored to the spool 14. The spool 14 is rotated in a take-up direction (the arrow C direction in FIG. 1) to take up the webbing on the spool 14.

The webbing take-up mechanism 16 is configured including a motor 22 and a non-illustrated clutch and gear, which transmit rotation of the motor 22 to the spool 14. The motor 22 is actuated and rotation of a rotation shaft of the motor 22 is transmitted through the clutch and gear to the spool 14 to rotate the spool 14 in the take-up direction. Note that in the present exemplary embodiment, for example, the motor 22 is actuated (the rotation shaft of the motor 22 is rotated) when the removal of a tongue, through which the webbing is inserted, from a buckle has been detected. The webbing is thereby taken up on the spool 14. In the present exemplary embodiment, the motor 22 is also actuated (the rotation shaft of the motor 22 is rotated) when eliminating slack of the webbing worn by the occupant. The webbing is thereby taken up on the spool 14 and slack of the webbing worn by the occupant is eliminated.

Explanation follows regarding detailed configuration of the frame 12, this being a main and relevant portion of the present exemplary embodiment.

In the present exemplary embodiment, two bolts 24 (first attachment portion) that are inserted through the back plate 18 of the frame 12 are screwed together with (attached to (fixed to)) two weld nuts 30 (second attachment portion), serving as a threaded portion, joined to (fixed to) a vehicle body panel 28 configuring part of a vehicle body 26. The webbing take-up device 10 is thereby attached to the vehicle body 26. To explain in detail, the back plate 18 includes a back plate body portion 32 that extends facing the spool 14. The back plate 18 also includes a fixed stay portion 34, serving as a fixed portion extending from a lower side (vehicle lower side in a state in which the webbing take-up device 10 is attached to the vehicle body 26) end portion of the back plate body portion 32 toward the lower side. The back plate 18 also includes a rotation stop stay portion 36, serving as a rotation stop portion extending from an upper side (vehicle upper side in the state in which the webbing take-up device 10 is attached to the vehicle body 26) end portion of the back plate body portion 32 toward the upper side via a bent portion 35.

Namely, in the present exemplary embodiment, the back plate body portion 32 is disposed between the fixed stay portion 34 and the rotation stop stay portion 36.

In the present exemplary embodiment, the bolts 24 (the first attachment portion) are screwed together with the weld nuts 30 (the second attachment portion) so that the webbing take-up device 10 is attached to the vehicle body 26. However, the present disclosure is not limited to the bolts 24 and the weld nuts 30 regarding the first attachment portion and the second attachment portion.

A bolt insertion hole 38 with a circular shape corresponding to an external diameter of the bolt 24 (one of the bolts 24) is formed in the fixed stay portion 34. The bolt 24 that is inserted through the bolt insertion hole 38 is screwed together with one of the weld nuts 30 joined to the vehicle body panel 28. The fixed stay portion 34 is thereby fixed to the vehicle body panel 28 in a state in which the one side face 32A of the fixed stay portion 34 is in close contact with a portion 28A where the one weld nut 30 is joined to the vehicle body panel 28.

As illustrated in FIG. 2, in a state in which the fixed stay portion 34 is fixed to the vehicle body panel 28 (see FIG. 1), the rotation stop stay portion 36 is spaced apart from (separated from) a portion 28B where another of the weld nuts 30 is joined to the vehicle body panel 28. A bolt insertion hole 40 with a circular shape corresponding to an external diameter of a collar 42, serving as a limiting portion, inserted with the bolt 24 (another of the bolts 24), is formed in the rotation stop stay portion 36. The bolt 24 is inserted through a washer 44 with a larger external diameter than an external diameter of a flange 24A of the bolt 24.

In the present exemplary embodiment, damping sheets 46, serving as a damping member, are provided between one side face 36A of the rotation stop stay portion 36 and the portion 28B of the vehicle body panel 28, where the other weld nut 30 is joined to the vehicle body panel 28, and between the other side face 36B of the rotation stop stay portion 36 and the washer 44 inserted with the bolt 24. Each damping sheet 46 is a sponge sheet, for example, and an opening 46A with a larger internal diameter than the external diameter of the collar 42 is formed in each damping sheet 46.

The bolt 24, which is inserted through the washer 44 and the collar 42, is inserted through the circular bolt insertion hole 40 of the rotation stop stay portion 36 and screwed together with the another weld nut 30. Rotational displacement of the rotation stop stay portion 36 relative to the fixed stay portion 34 (see FIG. 1) is thereby restricted.

In the present exemplary embodiment, when the bolt 24 inserted through the washer 44 and the collar 42 is screwed together with the another weld nut 30, the damping sheet 46 (one of the damping sheets 46), disposed between the one side face 36A of the rotation stop stay portion 36 and the portion 28B where the another weld nut 30 is joined to the vehicle body panel 28, is deformed in its thickness direction. The damping sheet 46 (another of the damping sheets 46), disposed between the another side face 36B of the rotation stop stay portion 36 and the washer 44 inserted with the bolt 24, is also deformed in its thickness direction. Due to the collar 42 being (abutted and) disposed between the washer 44 and the portion 28B of the vehicle body panel 28 where the another weld nut 30 is joined to the vehicle body panel 28, the deformation amount (in other words, crushing margin (allowance) in the thickness directions) of the two damping sheets 46 is limited. In the present exemplary embodiment, in a state which the bolt 24 inserted through the washer 44 and the collar 42 is screwed together with the another weld nut 30, the collar 42 inserted with the bolt 24 and an inner edge 40A of the bolt insertion hole 40 of the rotation stop stay portion 36 are spaced apart from (separated from) each other.

Operation and Advantageous Effects of Present Exemplary Embodiment

Explanation follows regarding operation and advantageous effects of the present exemplary embodiment.

As illustrated in FIG. 1 and FIG. 2, in the webbing take-up device 10 of the present exemplary embodiment, the bolt 24 inserted through the bolt insertion hole 38 of the fixed stay portion 34 is screwed together with the one weld nut 30 joined to the vehicle body panel 28. Moreover, the bolt 24 inserted through the washer 44 and the collar 42 is inserted through the bolt insertion hole 40 of the rotation stop stay portion 36 and is screwed together with the another weld nut 30. The webbing take-up device 10 is thereby attached to the vehicle body 26. Note that in the present exemplary embodiment, the rotation stop stay portion 36 of the frame 12 is spaced apart from the vehicle body 26 by (via) the damping sheet 46. This enables vibration occurring when the spool 14 is rotated to be suppressed from being transmitted from the rotation stop stay portion 36 of the frame 12 to the vehicle body 26.

In the webbing take-up device 10 of the present exemplary embodiment, the damping sheets 46 are provided between the one side face 36A of the rotation stop stay portion 36 and the portion 28B where the another weld nut 30 is joined to the vehicle body panel 28, and between the another side face 36B of the rotation stop stay portion 36 and the washer 44 inserted with the bolt 24. This enables vibration transmitted from the frame 12 to the vehicle body 26 to be damped by the damping sheets 46.

Furthermore, in the webbing take-up device 10 of the present exemplary embodiment, the collar 42 is disposed between the washer 44 and the portion 28B of the vehicle body panel 28 where the another weld nut 30 is joined to the vehicle body panel 28, such that the deformation amount (crushing margin (allowance) in the thickness directions) of the two damping sheets 46 is limited. This enables a reduction in the vibration damping effect of the damping sheets 46 arising due to excessive deformation of the damping sheets 46 to be suppressed.

In the webbing take-up device 10 of the present exemplary embodiment, the bolt 24 is inserted through the washer 44 that abuts the damping sheet 46 and has a larger external diameter than the external diameter of the flange 24A of the bolt 24. This enables torsional deformation of the damping sheet 46 when the bolt 24 is screwed together with the weld nut 30 provided to the vehicle body 26 to be suppressed.

In the webbing take-up device 10 of the present exemplary embodiment, the motor 22 of the webbing take-up mechanism 16 is actuated to rotate the spool 14 in the take-up direction and take up the webbing 100 on the spool 14. Note that in the present exemplary embodiment as described above, the rotation stop stay portion 36 of the frame 12 is spaced apart from the vehicle body 26. This enables vibration of the motor 22 to be suppressed from being transmitted from the rotation stop stay portion 36 of the frame 12 to the vehicle body 26. Vibration transmitted from the motor 22 to the vehicle body 26 through the rotation stop stay portion 36 of the frame 12 can also be damped by the damping sheets 46.

Note that in the present exemplary embodiment, an example has been explained in which the present disclosure is applied to the webbing take-up device 10 including the motor 22 that rotates the spool 14; however, the present disclosure is not limited thereto. Applying the present disclosure to a webbing take-up device that does not include the motor 22 enables vibration accompanying rotation of the spool 14 to be suppressed from being transmitted from the frame 12 to the vehicle body 26.

In the present exemplary embodiment, an example has been explained in which the damping sheets 46 are respectively provided between the one side face 36A of the rotation stop stay portion 36 and the portion 28B where the another weld nut 30 is joined to the vehicle body panel 28, this being between the rotation stop stay portion 36 of the frame 12 and the vehicle body 26, and between the another side face 36B of the rotation stop stay portion 36 and the washer 44 inserted with the bolt 24; however, the present disclosure is not limited thereto. Whether or not to provide the damping sheets 46 may be set as appropriate in consideration of the rigidity and so on of the frame 12 and the vehicle body 26 (the vehicle body panel 28).

In the present exemplary embodiment, an example has been explained in which the washer 44 with a larger external diameter than the external diameter of the flange 24A of the bolt 24 has been provided; however, the present disclosure is not limited thereto. Whether or not to provide the washer 44 may be set as appropriate in consideration of the permitted amount of torsional deformation of the damping sheets 46 and the like.

Figure 3:
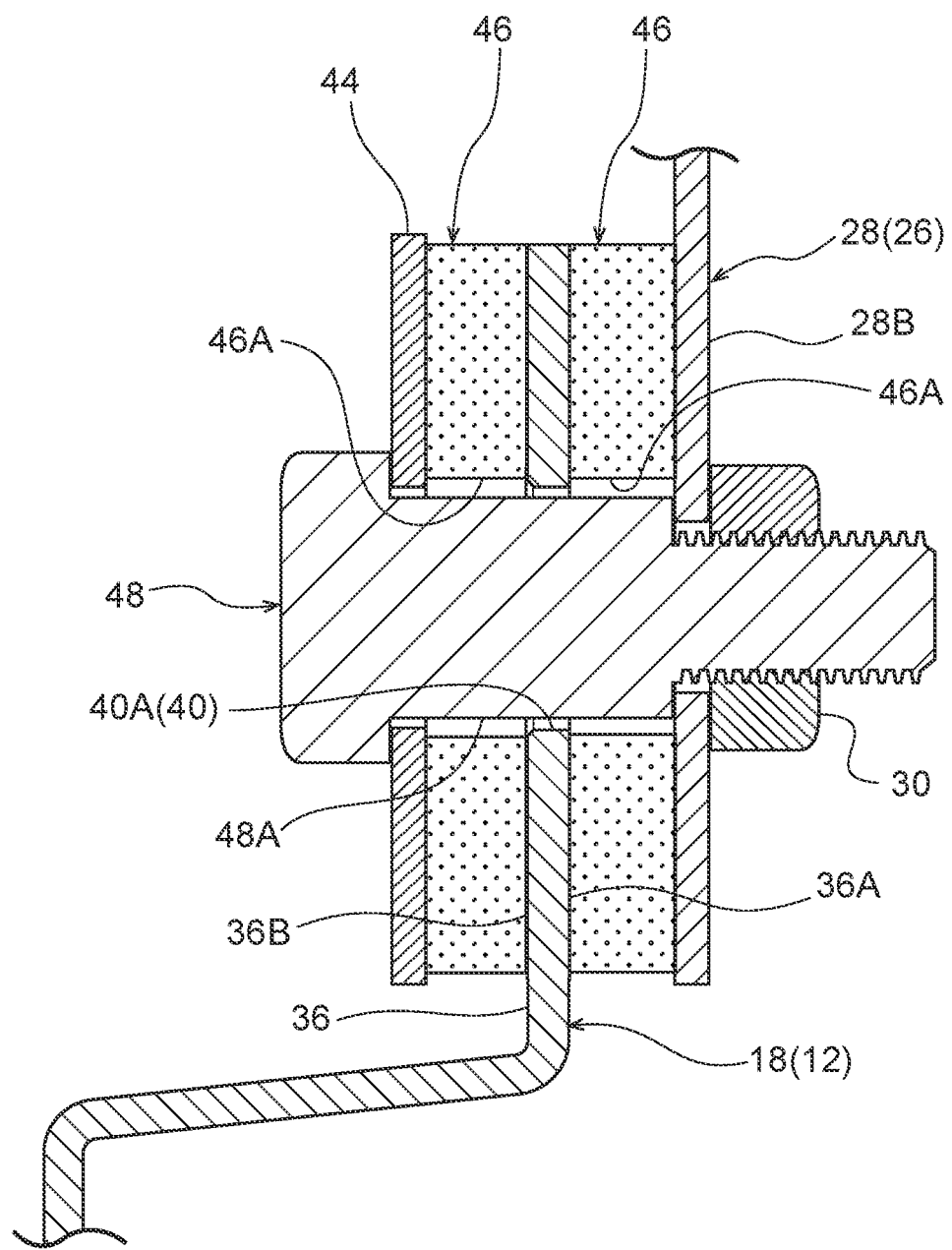
FIG. 3 is a cross-section corresponding to FIG. 2, illustrating a rotation stop portion of a frame of another exemplary embodiment.

In the present exemplary embodiment, an example has been explained in which the amount of crushing deformation of the damping sheets 46 is limited by providing the collar 42; however, the present disclosure is not limited thereto. For example, as illustrated in FIG. 3, employing a shoulder bolt (a bolt having step) 48 including a shoulder portion (step portion) 48A as a limiting portion enables the collar 42 to be omitted.

Explanation has been given regarding an exemplary embodiment of the present disclosure. However, the present disclosure is not limited to the above, and obviously various other modifications may be implemented within a range not departing from the spirit of the present disclosure.

What is claimed is:

1. A webbing take-up device, comprising:
    a spool that takes up a webbing worn by an occupant; and
    a frame at which the spool is rotatably supported, and that includes: a fixed portion that is at one side portion of the frame and that is fixed to a vehicle body, and a rotation stop portion that is at another side portion of the frame, which is at an opposite side of the spool from the one side portion, and that is disposed spaced apart from the vehicle body,
    wherein:
    a bolt, which is screwed together with a threaded portion provided at the vehicle body, is inserted through the rotation stop portion such that the rotation stop portion is engaged with the vehicle body so as to restrict rotational displacement of the rotation stop portion with respect to the fixed portion,
    the bolt is inserted through a washer,
    the bolt includes a flange portion, and an external diameter of the washer is larger than an external diameter of the flange portion,
    a first damping member, that damps vibration transmitted from the frame, is provided between the rotation stop portion and the vehicle body,
    a second damping member, that damps vibration transmitted from the frame and that is a member separated and independent from the first damping member, is provided between the rotation stop portion and the washer, and
    in a state in which the bolt is screwed together with the threaded portion, the washer abuts and presses the second damping member in a state in which the second damping member is deformed in a thickness direction thereof.

2. The webbing take-up device of claim 1, wherein: the first damping member is deformed between the rotation stop portion and the vehicle body; the second damping member is deformed between the rotation stop portion and the washer; and a limiting portion, that limits deformation amounts of the first damping member and the second damping member, is provided between the rotation stop portion and the vehicle body.

3. The webbing take-up device of claim 1, wherein a motor, that is actuated to rotate the spool in a take-up direction, is attached to the frame.

4. The webbing take-up device of claim 1, wherein:
the rotation stop portion is engaged with the vehicle body by an engaging member in a state of being sandwiched between the first damping member and the second damping member.

5. The webbing take-up device of claim 1, wherein: the first damping member is deformed between the rotation stop portion and the vehicle body; the second damping member is deformed between the rotation stop portion and the washer; and a limiting portion, that limits deformation amounts of the first damping member and the second damping member, is provided between the washer and the vehicle body.

* * * * *